July 28, 1970
H. PAPST
3,521,837
AIRFOIL
Filed June 30, 1967
3 Sheets-Sheet 1
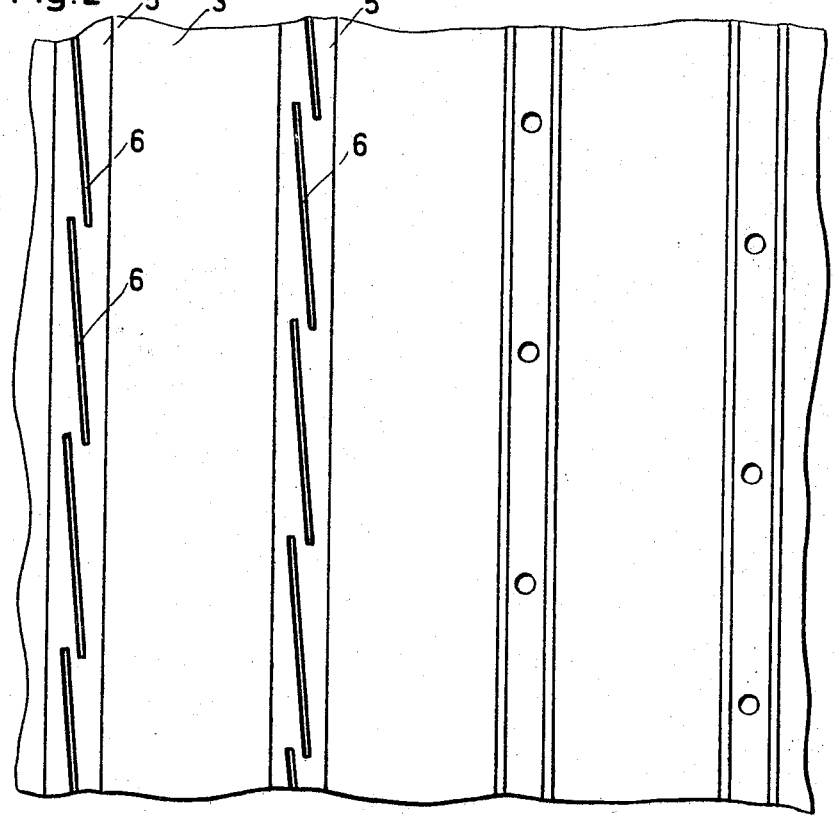
Inventor:
Hermann Papst
by Michael S Striker
Attorney July 28, 1970  H. PAPST  3,521,837
AIRFOIL
Filed June 30, 1967  3 Sheets-Sheet 2

$\beta \approx 3\alpha$

Inventor:
Hermann Papst by
Attorney

July 28, 1970 H. PAPST 3,521,837
AIRFOIL
Filed June 30, 1967 3 Sheets-Sheet 3

Inventor:
Hermann Papst by Michael S. Striker
Attorney

United States Patent Office 3,521,837
    Patented July 28, 1970

3,521,837
    AIRFOIL
    Hermann Papst, Karl-Maierstrasse 1, St. Georgen,
    Black Forest, Germany
    Filed June 30, 1967, Ser. No. 650,462
    Claims priority, application Germany, July 1, 1966,
    1,268,979
    Int. Cl. B64c 21/06
    U.S. Cl. 244—42                                          21 Claims

ABSTRACT OF THE DISCLOSURE

An arrangement for controlling the boundary layer which develops along the outer surfaces of airfoils and profiled bodies which come in direct contact with fluid streams. The airfoil is provided with one or several recesses which extend transversely of the direction of relative movement between airfoil and stream. The recess is covered by a longitudinal thin metallic strip so that a longitudinal and nearly completely closed channel is formed. The strip has a sharp upper edge at its leading flank and is fixed within the recess so that between sharp edge and opposite part there is a longitudinal narrow slot extending transversely of the direction of said relative movement. The boundary layer is compelled to enter the interior of said channel and the sharp edge peels off the stratum of the boundary layer which is adjacent to the surface of the airfoil. The sharp edge may be elevated above the opposite edge of the slot to improve the effect of "peeling off" the adjacent strata of the boundary layer. The strips are prefabricated and may be composed of two single strips with a narrow longitudinal slot between.

CROSS-REFERENCES TO RELATED APPLICATIONS

The problems of boundary layers developing at airfoils and boundary layer control means have been described in my copending application Ser. No. 332,619 filed on Dec. 23, 1963, now abandoned, and in the divisional applications divided out of said application, Ser. Nos. 534,732, now Pat. No. 3,435,654; 534,733, now Pat. No. 3,410,510; 534,809, now Pat. No. 3,407,539; 534,889, now Pat. No. 3,346,235; 534,906, now Pat. No. 3,319,593; and the continuation-in-part application Ser. No. 615,828, now Pat. No. 3,471,090.

BACKGROUND OF THE INVENTION

The present invention relates to airfoils and profiled bodies which come in direct contact with fluid streams, and more particularly to improvements in means for controlling the boundary layer which develops along the outer surfaces of such airfoils and profiled bodies. The invention also relates to an improved method of producing boundary layer control means for use in aircrafts, gliders, watercrafts and other automotive vehicles and many other types of machines wherein at least some component parts come in direct contact with fluid streams.

The problems which arise as a result of the fact that a thin layer of air or water will develop along the exposed surfaces of fuselages, wings, propeller blades, vanes and similar profiled bodies are well-known to designers of vehicles, blowers and turbines.

These problems, which have long been recognized in the art, are particularly critical in vehicles which are required to attain a very high speed in a fluid stream. This is true of fast-flying aircraft, and most particularly of flying craft which must pass through the earth atmosphere at extremely high speeds, for instance rockets required to attain escape velocity. In flying craft of this type any reduction which can be accomplished at all in the drag resulting on the craft from the boundary layer developing along the skin of the craft can mean a saving of fuel amounting to hundreds and perhaps thousands of pounds. Evidently, a reduction in the amount of fuel the craft is required to carry will permit an increase in the payload, an important consideration in the present relatively unsophisticated state of extra-terrestrial flight.

It is therefore evident that the elimination of the boundary layer which latter causes this drag, is of prime importance in the industry.

Attempts to utilize porous skins have met with little success because the pores will become clogged after comparatively short period of exposure to a fluid stream and because such pores reduce the smoothness of the skin so that the fluid stream meets greater resistance even if the boundary layer is eliminated. Also, a porous skin is weaker than a nonpermeable skin.

Several methods have already been proposed to make slots into airfoils and profiled bodies for sucking off the boundary layer but highly skilled personnel and special tools and machines are necessary to put these methods into practice.

SUMMARY OF THE INVENTION

The present invention overcomes the disadvantages set forth above, and provides the advantages and conditions which have been outlined as desirable.

In particular, the present invention makes it possible to provide an airfoil with boundary layer control means that can easily be manufactured by placing prefabricated parts into recesses of the airfoil.

This is accomplished by making at least one longitudinal recess in the outer surface of the airfoil extending transversely of the direction of said relative movement, then inserting a longitudinal thin metallic strip thus covering said recess and making a channel with a longitudinal narrow open slot whose width increases in a direction inwardly from said outer side and finally fastening said strip within said recess.

The inserted strip has a sharp upper edge at its leading flank wtih an angle of less than 60 degrees between outer surface and inwardly directed flank and is arranged within said recess so that between said sharp edge and the opposite metallic part there is a slot which extends transversely of the direction of said relative movement of said airfoil and the adjacent fluid through which the boundary layer may enter the interior of said channel. There are also means to convey the boundary layer from said channel to the outside of the airfoil.

In accordance with one feature of my invention said sharp edge is so fixed within said recess that between said sharp edge and an opposite edge a slot of at least .1 mm. but not exceeding .3 mm. width is formed. Owing to this rigid construction the width of the slot is not affected by stresses acting on the airfoil. In a preferred embodiment the sharp edge facing the fluid stream is elevated above the opposite edge, the elevation being about equal to the width of said slot. The sharp edges of the skin at both sides of each slot will actually peel off the boundary layer and will compel it to penetrate through the slots and into the interior. If the outer side of the skin is coated with one or more layers of lacquer, paint or the like, such materials cannot clog the slots because the width of the slots essentially increases in a direction from the inner side of the skin.

In accordance with another feature of my invention the inserted strip consists of two single strips arranged parallel and side by side with narrow slot between said single strip being firmly connected by metallic elements crossing said slots and being fixed to both single strips.

The metallic elements are fastened to both single strips on the inner side of said strips thus providing an uninterrupted entrance opening at the outer side of said strips.

The outer longitudinal flanks of said strips are inclined so that their distance increases towards the inside of said airfoil and the space between the adjacent flanks of the recesses in the airfoil and the inserted strips is filled with per se known plastic but self-hardening material and thus firmly fastening said strips within said recesses.

When using the invention in aircraft generally there will be a plurality of longitudinal recesses covered by thin metallic strips thus providing a plurality of narrow slots to remove the boundary layer. To avoid clogging of the slots by ice, the inserted strips should be made of a material having high ohmic resistance and should be electrically insulated from the adjacent metallic parts, so that the strips may be heated by an electric current. Thin foils of plastic material may be used for insulation.

The novel features which are considered as characteristic of the invention are set forth in particular in the appended claims. The improved airfoil both as to its construction and the method of producing the same, together with additional features and advantages thereof, will be best understood from the following detailed description of certain specific embodiments with reference to the accompanying drawings.

BRIEF DESCRIPTION OF THE DRAWING

FIG. 1 is a fragmentary vertical section through an airfoil constructed in accordance with my invention;

FIG. 2 is a top plan view on the airfoil of FIG. 1;

FIG. 3 is a fragmentary vertical section in an enlarged scale through an airfoil of FIG. 1;

DESCRIPTION OF THE PREFERRED EMBODIMENTS

Figure 4:
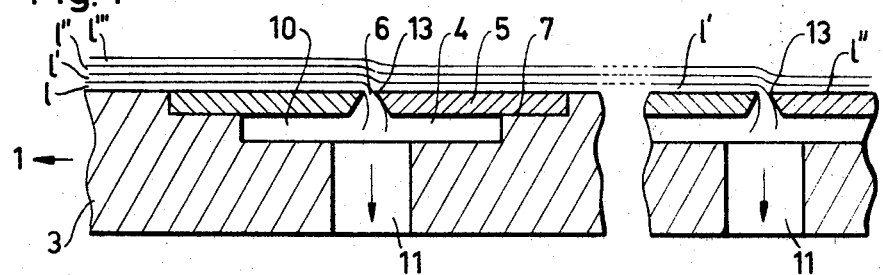
FIG. 4 is a fragmentary vertical section through a modified airfoil according to my invention showing how at least some strata of the boundary layer are removed.

Referring to the drawing and, in particular, to FIG. 1, there is illustrated an airfoil which might be part of a wing of an airplane. Arrow 1 indicates the direction in which the airfoil is moved, arrow 2 indicates the direction in which air is moving relative to the surface of the airfoil 3. Recesses 4 are made on the upper side of the skin 3 of the airfoil. These recesses are covered by longitudinal strips 5 which are provided with narrow longitudinal slots 6, easily to be seen in FIGS. 2 and 3. The uppermost part of the recesses are machined, e.g., by milling so that steps 7 with plane surfaces are obtained, on which strips 5 will be placed and fixed in a conventional per se known manner, e.g., by sticking. The depth to which the recesses are machined when making the steps will be in general equal to the thickness of the inserted strips 5 so that an even surface of the airfoil is obtained after placing the strips on the machine surface of the steps. There are narrow slots of .1–.3 mm. width between the inclined faces 8 and 9. The width of the slots 6 increases essentially in a direction from the surface of the airfoil toward the channel 10 which is formed by covering the recesses 4 with thin metallic strips 5. There are provided openings 11 which communicate by means of other channels (not shown) with the outside of the airfoil. In this way the boundary layer sucked in through slots 6 will be conveyed to the outside again.

In FIGS. 1 and 2 the two recesses on the left side are already covered by strips 5 whereas the two recesses on the right are still open and the strips not yet placed on the upper side of the steps 7.

The slots are preferably but need not always be perpendicular to the direction of fluid flow, and they may be staggered with reference to each other so as to make sure that the boundary layer may be removed from all sections of the outer surface.

FIG. 4 shows a slightly modified version of the arrangement illustrated in FIGS. 1–3. The recesses 4 and the steps 7 are made by milling. Along the upper surface of the airfoil a boundary layer will be produced and four consecutive strata of the boundary layer are marked by 1, 1', 1" and 1'''. When the airfoil is moved as indicated by arrow 1, stratum 1 being nearest to the surface of the airfoil will be sucked in through slot 6 into channel 10 and removed through opening 11. Thus the resistance which the airfoil meets in moving with reference to a surrounding fluid stream will be considerably reduced. The sharp edge 13 will actually peel off the nearest stratum 1 and will compel it to penetrate through slot 6 and into the interior of channel 10. On the right side of the sharp edge 13 the hitherto second stratum 1' will—after stratum 1 has been sucked off—be nearest to the surface of the airfoil. When this stratum reaches the next slot (shown on right side of FIG. 4), then the sharp edge 13 will peel off this stratum 1' from the rest of the boundary layer and compel it to penetrate through the slot which is in front of edge 13. In this way stratum 1' is removed and behind edge 13 stratum 1" will be nearest to the outside of the airfoil. The process of peeling off one stratum of the boundary layer may be repeated again by consecutive slots and sharp edges which are not shown in FIG. 4. Any strata sucked in in front of the sharp edge 13 will change its direction by angle $\alpha$ as indicated in the following FIG. 5.

Figure 5:
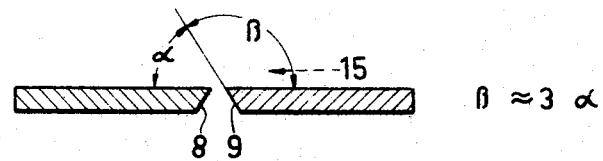
FIG. 5 illustrates a detail of the airfoil of FIG. 4.

FIG. 5 illustrates diagrammatically what effect the invention has on boundary layers that for any reason might have the boundary to flow reverse as indicated by dotted arrow 15. Any strata which has the tendency to approach a slot in the direction of arrow 15 meets near the sharp edge 13 the strata which is just sucked in in front of said edge. Therefore any strata floating in reverse direction would be stopped there. There is practically no chance that a reverse moving strata would be sucked in through slot 6 as the direction of said strata would then have to be changed by angle $\beta$ which is considerably greater than the aforementioned angle $\alpha$.

Figure 6:
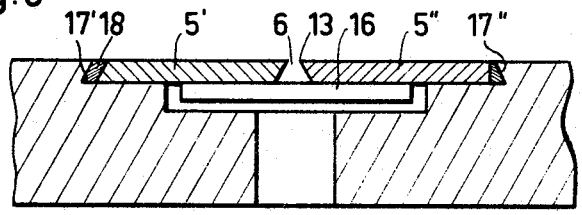
FIG. 6 is a fragmentary vertical section through another modified airfoil according to my invention.

FIG. 6 illustrates another slightly modified version of the arrangement shown in FIG. 4. The longitudinal strip 5 having narrow slots 6 is composed of two single strips 5' and 5" which are firmly connected by metallic elements 16. These elements 16 are crossing slot 6 and are fixed, e.g., by welding to both single strips 5' and 5". In the embodiment shown in FIG. 6 the machined uppermost part of the recess has inclined flanks 17' and 17". The space 18 between flank 17' and the opposite flank of single strip 5' is filled by plastic material. This material is self-hardening and will firmly fasten the inserted strips within the dovetail-shaped portion of the recess.

In FIG. 6 there are shown two different modifications of the shape of the outer flanks of the inserted strips. On the left side the inclined flank 17 and the opposite flank of strip 5' are parallel whereas on the right side the outer flank of strip 15' is not parallel to the inclined flank 17' so that the inserted plastic material has the shape of a wedge.

Figure 7:
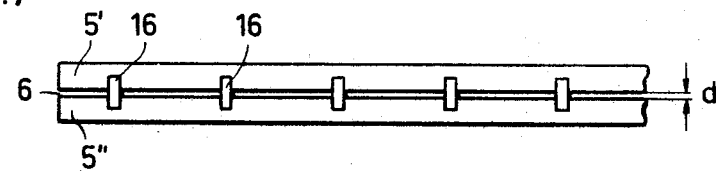
FIG. 7 is a plan view on the underside of two single strips firmly connected by metallic elements, ready for insertion into the airfoil of FIG. 6.

FIG. 7 illustrates how the strip is composed of two single strips 5' and 5'' which are firmly connected by metallic elements 16 so that there is a longitudinal slot 6 having a width $d$ between the facing flanks of strips 5' and 5''. The metallic elements improve the mechanical resistance of the inserted strip to bending or twisting stresses and such elements are of particular advantage when the slots are comparatively long, when the slots are closely adjacent to each other, and/or when the material of the thin strips is easily deformable.

Figure 8:
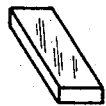
FIGS. 8, 9 and 10 are illustrating different shapes of metallic elements connecting the two single strips shown in FIG. 7.
Figure 9:
Figure 10:

FIGS. 8, 9 and 10 illustrate by way of example different shapes of the metallic elements 16 which are diagrammatically shown in FIG. 7.

Figure 11:
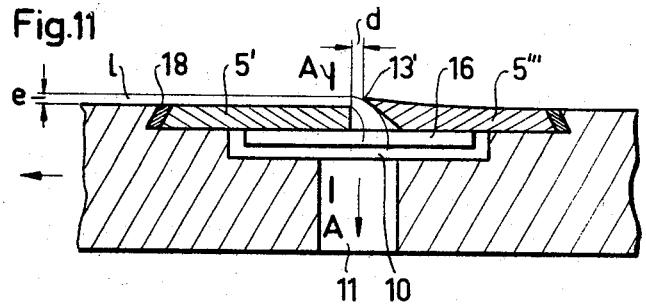
FIG. 11 is a fragmentary vertical section through another modified airfoil according to my invention.

FIG. 11 illustrates a slightly modified version of the arrangement shown in FIG. 6. The inserted longitudinal strip is combined of two single strips 5' and 5''', the latter having an elevated sharp edge 13'. The elevation $e$ of edge 13' above the level of the outer surface of the strip 5' is preferably about equal to the width $d$ of the slot between adjacent faces of the strips 5' and 5'''. This elevation of edge 13' facilitates peeling of stratum 1 and conveying it into the interior of channel 10 and opening 11. The skin 3 of the airfoil and the strip 5' together form skin means. For example and if the arrangement of FIG. 4 is part of the outer covering of an airplane wing, the wing moves in a direction from right to left as indicated by an arrow so that the slot between strips 5' and 5''' extends substantially transversely of the fluid stream. The stratum 1 of the boundary layer will flow continuously and with minimal deflection through the slots. The inclined flank of strip 5''' directs the stratum of the boundary layer during its flow through the slot and insures that the deflection of the stratum is less than 45 degrees. This reduces turbulence in the region of the slot.

Figure 12:
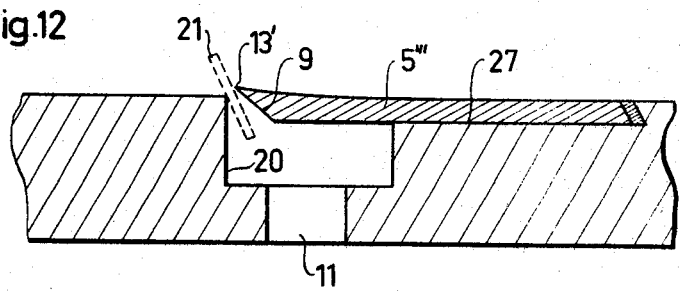
FIG. 12 is a fragmentary vertical section through still another modified airfoil according to my invention.

FIG. 12 illustrates a slightly modified version of the embodiment of FIG. 11 having only one single inserted strip 5''' with an elevated sharp edge 13'. In the embodiment of FIG. 12 the slot is formed between the inclined flank 9 of strip 5''' and the opposite flank 20 of the machined recess. The short width of the slot may be obtained by inserting a sheet 21 indicated by dotted lines before fixing strip 5''' on step 27 of the recess.

Figure 13:
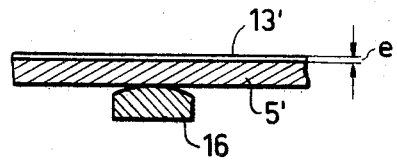
FIG. 13 is a fragmentary vertical sectional view along the lines A—A in FIG. 11.

FIG. 13 shows in detail a fragmentary vertical section view along lines A—A in FIG. 11. The metallic element 16 is welded to strip 5' and also to strip 5'''. Strip 5''' is arranged behind strip 5' so that only its elevated sharp edge 13' is visible in FIG. 13.

Figure 14:
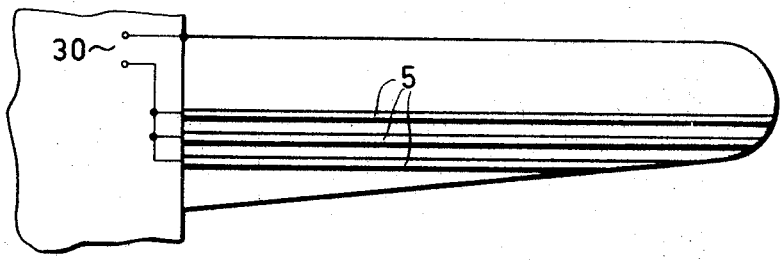
FIG. 14 is a top plan view on a section of an airplane provided with airfoils according to the invention illustrating also diagrammatically a method of defrosting the slots.

FIG. 14 illustrates diagrammatically how the slots may be defrosted when a plurality of strips 5 is inserted into the covering of airplane wings. The strips are made of material with high ohmic resistance, e.g., titanium, titanium alloy or a chromium-nickel alloy. The strips are fixed within the recesses by thin sheets of polyester having good thermal and electrical insulation. Only one end of the strips is electrically connected to the metallic body of the wing. The other end of the strips is connected to an electrical source 30 as indicated in FIG. 14 so that an electric current of high intensity can be sent along the strips and raise the temperature. In this way it can be avoided that the slots may be clogged by ice, when the airplane is high up in the air.

What is claimed as new and desired to be protected by Letters Patent is set forth in the appended claims.

1. An airfoil adapted to be placed into a fluid stream and having an outer side along which a boundary layer develops during relative movement of said airfoil and said fluid stream, comprising skin means having an outer surface provided with at least one recess extending transversely of the direction of said relative movement and being bounded by opposite trailing and leading marginal portions; an elongated strip arranged in and partly covering said recess so as to form therewith an elongated channel, said strip having a trailing edge portion in contact with said skin means along said trailing marginal portion of said recess so as to close said recess along said trailing marginal portion thereof and having a leading flank provided with a sharp edge extending along but spaced from said leading marginal portion of said recess to define therewith at least one elongated slot communicating with said channel and through which a boundary layer can be aspirated into channel, said flank being inclined inwardly into said channel away from said sharp edge ad including with said outer surface an angle smaller than 60°; and means for conveying said aspirated boundary layer from said channel to said outer side at a location remote from said slot.

2. The airfoil as defined in claim 1; further comprising suction generating means for drawing the boundary layer into said channel via said slot.

3. The airfoil as defined in claim 1, said outer surface of said skin means being provided with a plurality of additional recesses, all of said recesses extending transversely of the direction of said relative movement, and an additional strip similar to the first-mentioned strip arranged in each of said additional recesses to form therewith an additional elongated channel.

4. The airfoil as defined in claim 1, said sharp edge and said leading marginal portion being arranged in parallel and so spaced apart that said slot has a width of at least 0.1 mm.

5. The airfoil as defined in claim 4, wherein the width of said slot in the region of said outer surface is at most 0.3 mm.

6. The airfoil as defined in claim 1, wherein said sharp edge extends between outer surface and said flank at an angle of at most 45°.

7. The airfoil as defined in claim 1, wherein said sharp edge faces said fluid stream and is elevated above said leading marginal portion of said slot by at least 0.1 mm.

8. The airfoil as defined in claim 7, wherein the elevation of said sharp edge is at most 0.3 mm. above said leading marginal portion.

9. An airfoil adapted to be placed into a fluid stream and having an outer side along which a boundary layer develops during relative movement of said airfoil and said fluid stream, comprising a skin having an outer surface provided with at least one recess extending transversely of the direction of said relative movement and being bounded by opposite edge portions; an elongated strip including two strip portions arranged in said recess side by side and defining with one another at least one elongated slot communicating with said channel and through which boundary layer can enter said channel, one of said strip portions having a leading flank provided with a sharp edge extending along the trailing flank of the other of said strip portions and defining therewith said slot, and said leading flank being inclined inwardly into said channel away from said sharp edge and including with said outer surface an angle smaller than 60°; holding elements extending across said slot and being rigidly connected to both of said strip portions, and means for conveying the aspirated boundary layer from said channel to said outer side at a location remote from said slot.

10. The airfoil as defined in claim 9, said holding elements being connected to both of said strip portions on the inner sides thereof so that said slots are unobstructed at said outer surface of said skin.

11. The airfoil as defined in claim 9, wherein said elements are lengths of wire.

12. The airfoil as defined in claim 9, wherein said elements have convex surfaces which face said strip portions.

13. The airfoil as defined in claim 9, wherein both of said flanks are inclined and diverge from one another in direction inwardly of said channel.

14. The airfoil as defined in claim 9, wherein said edge portions are inclined to and extend in substantial parallelism with a respectively adjacent marginal portion of said strip portions.

15. The airfoil as defined in claim 9, wherein said edge portions are each proximal to a marginal portion of one of said strip portions and are grooved.

16. The airfoil as defined in claim 9, wherein said edge portions are each proximal to but spaced from a marginal portion of one of said strip portions; and further comprising a self-hardening plastic material filling the respective spaces and firmly fastening said strip portions within said recess.

17. A method of making an airfoil, comprising the steps of providing airfoil skin means; providing at least one elongated stepped recess having leading and trailing edge portions in the outer surface of the airfoil skin means; inserting at least one elongated thin strip into said recess in contact with said trailing edge portion of said recess for covering said recess and forming with the leading edge portion of said recess a channel having an elongated narrow open slot whose width increases in a direction inwardly from said outer surface so that a boundary layer which develops along said outer surface during relative movement between said airfoil and a fluid stream may enter through said slot; and fastening said strip within said recess to said airfoil skin.

18. Method as defined in claim 17; further comprising the step of introducing self-hardening plastic material into a space defined between an edge portion of said recess and an adjacent marginal portion of said strip so as to retain the latter in said recess and connect it with said airfoil skin means.

19. Method as defined in claim 17; further comprising the steps of providing additional elongated stepped recesses in said outer surface; inserting into each additional recess an additional elongated thin metallic strip thus covering the respective additional recess and defining with it a channel with an elongated narrow slot; and fastening the respective additional strips in the associated additional recesses to said airfoil skin means.

20. Method as defined in claim 17; further comprising the step of electrically insulating the inserted strip from adjacent metallic parts of said airfoil skin means.

21. Method as defined in claim 17, comprising the step of machining the lateral edge faces bounding said recess prior to inserting of said strip.

References Cited

UNITED STATES PATENTS

| | | | |
|---|---|---|---|
| 2,406,920 | 9/1946 | Stalker | 244—42 |
| 2,925,231 | 2/1960 | Pfaff et al. | 244—42 |
| 3,117,751 | 1/1964 | Rogers et al. | 244—42 |
| 3,374,971 | 3/1968 | Heskestad | 244—42 X |
| 2,742,247 | 4/1956 | Lachmann | 244—130 |
| 2,841,344 | 7/1958 | Stroukoff | 244—130 X |
| 3,128,973 | 4/1964 | Dannenberg | 244—130 |
| 3,366,352 | 1/1968 | Edwards et al. | 244—130 |
| 3,467,348 | 9/1969 | Lemelson. | |

MILTON BUCHLER, Primary Examiner

J. L. FORMAN, Assistant Examiner

U.S. Cl. X.R.

29—157.3, 163.5; 244—130